UNITED STATES PATENT OFFICE.

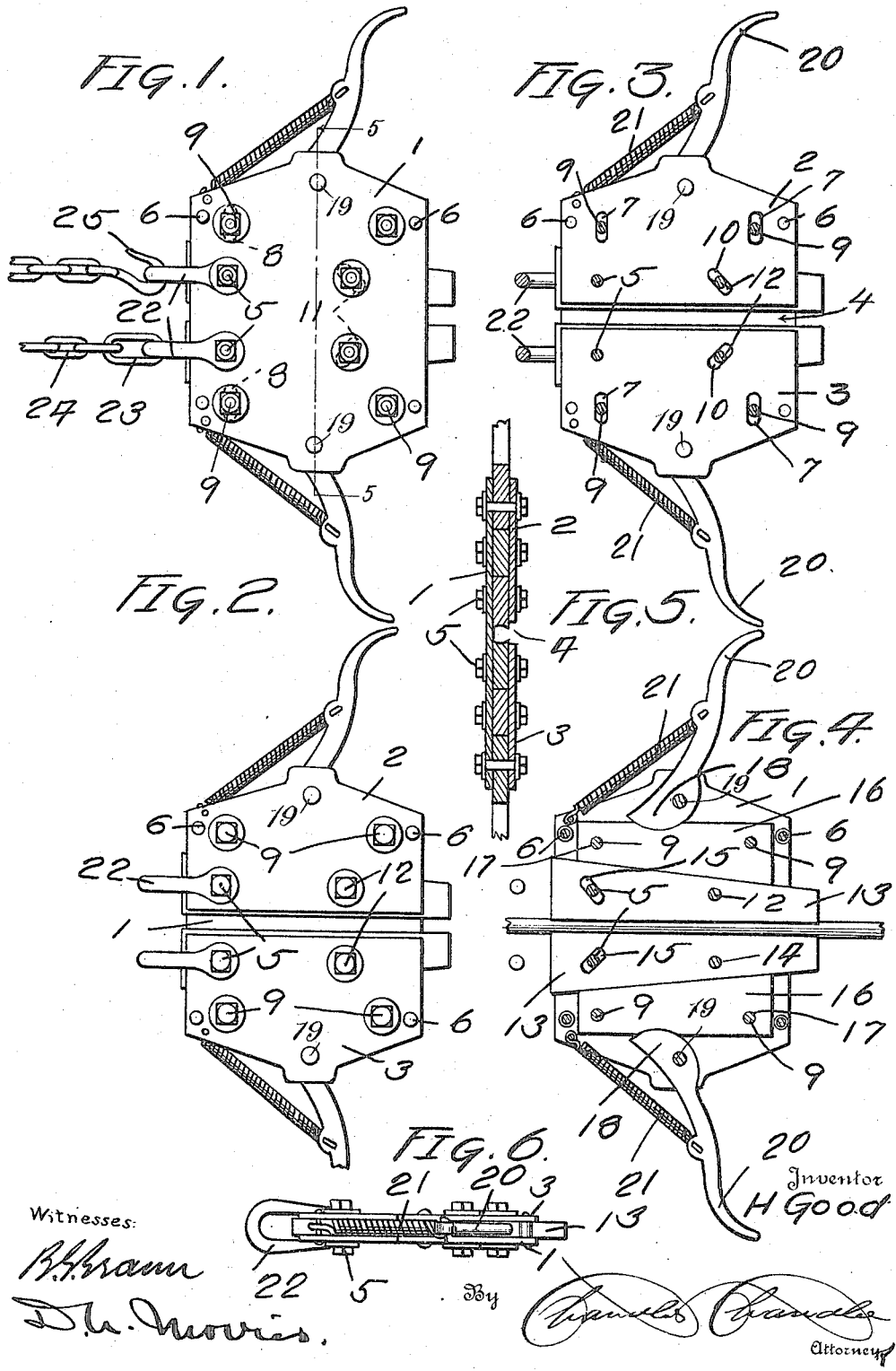

HENRY GOOD, OF SPARKS, OKLAHOMA.

WIRE-CLAMP.

1,187,726.

Specification of Letters Patent.

Patented June 20, 1916.

Application filed June 14, 1915. Serial No. 33,960.

*To all whom it may concern:*

Be it known that I, HENRY GOOD, a citizen of the United States, residing at Sparks, in the county of Lincoln, State of Oklahoma, have invented certain new and useful Improvements in Wire-Clamps; and I do hereby declare the following to be a full, clear, and exact description of the invention, such as will enable others skilled in the art to which it appertains to make and use the same.

This invention relates to a wire clamp.

An object of the invention resides in the provision of a device by means of which the same may be secured to a block and tackle and used to clamp a smooth wire so that the same may be readily stretched.

A further object of the invention resides in so constructing the device that its clamping action may be automatic.

With these and other objects in view, such as will appear as the description progresses, my invention comprises the combination and arrangement of parts as set forth in and falling within the scope of the appended claims.

Referring to the drawing: Figure 1 is a plan view looking at one side of my device. Fig. 2 is a similar view looking at the opposite side. Fig. 3 is a view looking at the same side as shown in Fig. 2 with the bolts in section to show the positions of the slots in the plates. Fig. 4 is a sectional view looking at the same side as shown in Figs. 2 and 3 with the near plates removed and showing the wire in place. Fig. 5 is a section on line 5—5 of Fig. 1. Fig. 6 is an elevational view looking at the edge of the device.

Referring to the drawing wherein like parts are indicated by like characters throughout the several views:—In the embodiment of my invention shown in the drawing I have provided a plate 1 on which is mounted, in spaced relation, a pair of plates 2 and 3, the inner edges of which are spaced apart to form a slot 4. These plates 2 and 3 are secured to the plate 1 by means of bolts 5 and rivets 6. Extending through slots 7 in the plates 2 and 3 and through similar slots 8 in the plate 1 are bolts 9 which have nuts and washers on the ends thereof, the washers bearing against the outer faces of the plates. Extending through diagonally arranged slots 10 in the plates 2 and 3 and similar slots 11 in the plate 1 are bolts 12 similar to the bolts 9 and having nuts and washers on the ends thereof. Slidably mounted between the plates 2 and 3 and the plate 1 are gripping members 13. The bolts 12 aforementioned pass through circular apertures 14 in these gripping members, while the bolts 5 pass through diagonally arranged slots 15 in the gripping members 13. Slidably mounted between the plates 2 and 3 and the plate 1 and arranged adjacent the outer edges of the gripping members 13 are guides 16. The bolts 9 aforementioned pass through circular apertures 17 in these guides 16. Thus the gripping members 13 may move together because of the fact that the bolts 5 will slide in the slots 15 in the gripping members and the bolts 12 will slide in the slots 10 and 11 in the plates. The guide members may move toward each other because of the fact that the bolts 9 will slide in the slots 7 in the plates. The inner edges of the guides 16 and the outer edges of the gripping members 13 are inclined so that the gripping members form, virtually, a wedge for a purpose which will later appear.

In order that the guide members may always follow the gripping members in their inward movement I have pivoted a pair of cams 18 between the plates 2 and 3 and the plate 1 at 19, which cams are provided with outwardly extending handles 20. Secured to these handles 20 of the cams and to certain of the rivets 6 are coil springs 21 which move the cams so that they normally tend to force the guides 16 inwardly. Secured to the bolts 5 are clevises 22 to one of which is secured a link 23. Secured to this link 23 is a chain 24 which has a hook 25 on the end thereof, which hook is adapted to engage the other of the clevises 22 to form a loop of the chain for the attachment of a block and tackle or other suitable force applying means. The adjacent edges of the gripping members 13 lie directly beneath the slot 4 formed between the plates 2 and 3 and one of the clevises is arranged on each side of this slot.

In using the device a strand of wire is inserted through the slot 4 so that it will lie between the gripping members 13. A pull is then applied to the chain and the gripping members will be forced toward each other, the bolts 5 riding in the slots 15 in the gripping members and the bolts 12 riding in the slots 10 and 11 in the plates.

Thus the strand of wire will be firmly gripped so that it may be stretched. Upon the inward movement of the gripping members 13 the springs 21 will move the cams 18 and force the guides 16 inwardly against the outer faces of the gripping members.

From the foregoing description it will be seen that I have provided a device for clamping a wire so that the wire may be stretched and I have so constructed the device that its action will be automatic. Furthermore I have provided a pair of gripping members which will be moved together when tension is applied to the wire and I have further provided guide members for said gripping members, which guide members follow the gripping members in their inward movement so as to always be in contact therewith to guide the same.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:—

1. In a wire clamp, the combination with a plate, of a pair of plates secured thereto in spaced relation to the first mentioned plate and having their inner edges spaced apart, gripping members slidably mounted between said first mentioned plate and said last mentioned plates, guides for said gripping members, the said gripping members being adapted to move together to grip a wire therebetween and means for moving the guides automatically upon the movement of the gripping members.

2. In a wire clamp, the combination with a plate, of a pair of gripping members slidably mounted thereon and adapted to move together, guides for said gripping members slidably mounted on the plate, cams pivoted to said plate and bearing against the outer edges of the said guides and springs for operating said cams to cause them to exert an inward pressure upon the said guides.

In testimony whereof, I affix my signature, in the presence of two witnesses.

HENRY GOOD.

Witnesses:
LEO HUGHES,
C. N. HOWARD.

Copies of this patent may be obtained for five cents each, by addressing the "Commissioner of Patents, Washington, D. C."